United States Patent [19]
DeRudder et al.

[11] Patent Number: 5,025,066
[45] Date of Patent: Jun. 18, 1991

[54] POLYCARBONATE AND POLYESTER BLENDS MODIFIED WITH POLYORGANOSILOXANE GRAFT POLYMERS COMBINED WITH DIENE RUBBER-BASED GRAFT POLYMERS

[75] Inventors: James L. DeRudder, Mt. Vernon, Ind.; I-Chung W. Wang, Williamstown, Mass.

[73] Assignee: General Electric Company, Pittsfield, Mass.

[21] Appl. No.: 271,246

[22] Filed: Nov. 14, 1988

[51] Int. Cl.$^5$ .................... C08G 63/47; C08L 51/04
[52] U.S. Cl. ........................... 525/66; 525/63; 525/67; 525/100; 525/104; 525/105; 525/421; 525/422; 525/439; 525/440; 525/445; 525/464; 525/479; 525/902
[58] Field of Search ............. 525/67, 63, 66, 100, 525/105, 104, 421, 422, 439, 445, 440, 464, 479, 902

[56] References Cited

U.S. PATENT DOCUMENTS

| | | | |
|---|---|---|---|
| 2,465,319 | 3/1949 | Whinfield | 260/75 |
| 2,891,920 | 6/1959 | Hyde et al. | 260/29.2 |
| 2,901,466 | 8/1959 | Kibler et al. | 260/75 |
| 3,047,539 | 7/1962 | Pengilly | 260/75 |
| 3,220,972 | 11/1965 | Lamoreaux | 260/46.5 |
| 3,271,367 | 9/1966 | Schnell et al. | 260/49 |
| 3,737,409 | 6/1973 | Fox | 260/49 |
| 3,775,452 | 11/1973 | Karstedt | 260/429 |
| 3,898,300 | 8/1975 | Hilliard | 260/827 |
| 4,071,577 | 1/1978 | Falender et al. | 260/827 |
| 4,226,761 | 10/1980 | Cooper et al. | 525/63 |
| 4,556,705 | 12/1985 | McCready | 528/289 |
| 4,564,653 | 1/1986 | Kamata et al. | 525/67 |
| 4,812,515 | 3/1989 | Kress et al. | 525/69 |

FOREIGN PATENT DOCUMENTS

| | | | |
|---|---|---|---|
| 1590549 | 6/1981 | European Pat. Off. | |
| 0051471 | 5/1982 | European Pat. Off. | 525/66 |
| 0166900 | 1/1986 | European Pat. Off. | |
| 0217257 | 4/1987 | European Pat. Off. | 525/479 |
| 0231776 | 8/1987 | European Pat. Off. | 525/63 |
| 0249964 | 12/1987 | European Pat. Off. | |
| 0260552 | 3/1988 | European Pat. Off. | |

Primary Examiner—John C. Bleutge
Assistant Examiner—Ralph Dean, Jr.
Attorney, Agent, or Firm—Hedman, Gibson, Costigan & Hoare

[57] ABSTRACT

Polycarbonate and polyester blends are prepared with a combination of modifiers comprising a multi-stage polyorganosiloxane-based graft polymer composition and a diene rubber-based graft polymer composition imparting a wide range of excellent physical properties on the PC and PE blends.

34 Claims, No Drawings

POLYCARBONATE AND POLYESTER BLENDS MODIFIED WITH POLYORGANOSILOXANE GRAFT POLYMERS COMBINED WITH DIENE RUBBER-BASED GRAFT POLYMERS

CROSS-REFERENCE TO RELATED APPLICATIONS

This application is related to the following commonly owned, concurrently-filed U.S. Pat. applications:

| SER. NO. | SUBJECT MATTER | APPLICANT(S) |
|---|---|---|
| 07/271,250 | Polyorganosiloxane/polyvinyl-based Graft Polymers, Process and Thermoplastic Compositions Containing the Same | I-C. W. Wang |
| 07/271,223 | Thermoplastic Molding Compositions Containing Polyorganosiloxane/Polyvinyl-based Graft Polymer Modifiers | J. L. DeRudder F. J. Traver I-C. W. Wang |
| 07/271,222 | Low Gloss Molded Articles Using polyorganosiloxane/polyvinyl-based Graft Polymers | J. L. DeRudder H. Savenije I-C. W. Wang |
| 07/271,249 | Polyphenylene ether or Polyphenylene ether/Polystyrene with Polyorganosiloxane/polyvinyl-based Graft Polymer Modifiers | M. A. Alsamarraie W. R. Haaf W. J. Peascoe I-C. W. Wang |
| 07/271,248 | Polyorganosiloxane/polyvinyl-based Graft (meth)-acrylate Polymers | M. A. Alsamarraie S. Y. Hobbs I-C. W. Wang V. H. Watkins |
| 07/271,247 | Polyester, Polycarbonate and/or Polyphenylene ether with Polyorganosiloxane/polyvinyl-based Graft (meth)-acrylate Polymer | M. A. Alsamarraie S. Y. Hobbs I-C. W. Wang V. H. Watkins |
| 07/271,230 | Flame Retardant Polyorganosiloxane-based Graft Polymers | I-C. W. Wang |
| 07/271,896 | Polyesters Modified with Polyorganosiloxane/polyvinyl-based Graft Polymers | J. L. DeRudder I-C. W. Wang |

FIELD OF THE INVENTION

This invention relates to thermoplastic polycarbonate resins and blends with a thermoplastic polyester resin modified by a combination of a multi-stage polyorganosiloxane-based graft polymer composition and a diene rubber-based graft polymer composition.

BACKGROUND OF THE INVENTION

There have been many attempts in the art to provide polyorganosiloxane-based graft polymers which may be useful as impact strength modifiers for thermoplastic resins. See, for example, U.S. Pat. No. 2,891,920 (J. F. Hyde, et al.); and O. Graiver, et al., Rubber Chem. Tech., 56 (5), 918 (1983).

U.S. Pat. No. 3,898,300 states that a polyorganosiloxane-based graft copolymer for improving the impact strength of S/AN resin is formed by grafting S/AN comonomers in an emulsion system onto the vinylsiloxane or allylsiloxane containing silicone substrate. U.S. Pat. No. 4,071,577 describes a similar approach by using a mercaptosiloxane in place of vinyl-group containing siloxanes. European Patent 0,166,900 reports further improvement of polysiloxane-based graft polymers and increased S/AN impact strength by using acryloxyfunctionalized siloxane as the graft-linking agent. These graft polymers are utilized in connection with the impact modification of S/AN. British Patent No. 1,590,549 describes the use of a polyorganosiloxane graft copolymer in various plastic molding compositions. Similarly, European Patent Application 0,249,964 describes the use of a polyorganosiloxane graft copolymer in the polycarbonate containing blends.

None of the references disclose the in-situ co-homopolymerization of vinyl monomers in the presence of siloxanes in an emulsion system, as described hereinbelow. The present invention is also directed to the use of graft polymers provided by subsequent graft polymerization of vinyl monomers (e.g. polymethyl (meth-)acrylate, polystyrene or styrene/acrylonitrile copolymer) in the presence of such a co-homopolymerized polyorganosiloxane/vinyl-based substrate.

The use of a diene or acrylic rubber-based impact modifiers in thermoplastic resins has become a common practice in the art. The selection of either material depends largely on the end use purposes, such as weatherability or low temperature impact resistance. Uniform color appearance of molded parts is a benefit which is gained by using a diene-based impact modifier over acrylics. However, the unsaturated moieties of the diene rubber restrict its outdoor use to some extent due to its tendency to oxidize and yellow.

Surprisingly, it has been found that partial replacement of the oxidation or ozone sensitive rubber by a silicone-based rubber effects more improvements, such as low temperature ductility, low gloss, and impact and discoloring resistance against thermal aging on the blends described hereinafter. Unexpectedly, it is now possible to prepare low gloss polycarbonate and polyester blends having both excellent low temperature impact resistance and discoloration resistance by the addition of an effective amount of a silicone-based impact modifier to a diene-based impact modifier. Mention is also made to EPO 0,260,558 which discloses a combination of a silicone-based impact modifier with an alkylacrylate-based modifier. The patentee, however, makes no mention of the use of a diene-based impact modifier.

SUMMARY OF THE INVENTION

According to the present invention there are provided compositions comprising a polycarbonate resin (A); a mixture (A-1) comprising (i) a polycarbonate resin and (ii) a saturated polyester resin; a mixture (A-2) comprising (i) a polycarbonate resin and (iii) a poly(etherester) elatomer, a poly(etherimide ester) elastomer or a mixture thereof; a mixture (A-3) comprising (i) a polycarbonate resin, (ii) a saturated polyester resin and (iii) a poly(etherester) elastomer, a poly(etherimide ester) elastomer or a mixture thereof; or a mixture (A-4) of any of the foregoing; and an effective amount of a modifier composition (B) comprising in combination
a multi-stage polyorganosiloxane-based graft polymer composition (B-1) comprising
(a) as a first stage,
  (i) an organosiloxane polymer, units derived from a cross-linking agent or agents and optionally units which serve as a graft-linking agent or agents; or
  (ii) a polymeric co-homopolymerized substrate comprised of, in combination, an organosiloxane polymer, a vinyl polymer, and optionally units derived from a crosslinking agent or agents; units which serve as a graft-linking agent or agents; units derived from a cross-linking agent or agents and graft-linking agent or agents, or a mixture of any of the foregoing units; or a mixture of (i) and (ii); and
(b) at least one subsequent stage or stages graft polymerized in the presence of any previous stage and which is comprised of a vinyl-based polymer or a cross-linked vinyl-based polymer; and a diene rubber-based graft polymer composition (B-2) comprising
(a) as a first stage a polymeric substrate comprised of units of a diene rubber and units which serve as graft-linking agent or agents; and
(b) at least one subsequent stage graft polymerized in the presence of any previous stages and which is comprised of a vinyl-based polymer or a cross-linked vinyl-based polymer, the weight ratio of B-1 to B-2 being from 1 to 9:9 to 1.

A preferred composition comprises a mixture (A-1) comprising (i) a polycarbonate resin and (ii) a saturated polyester resin.

Preferably component A, A-1, A-2, A-3 or A-4 comprises from 1 to 99 parts by weight and components B-1 and B-2 comprises from 99 to 1 part by weight per 100 parts by weight of A, A-1, A-2, A-3 or A-4 and B-1 and B-2 combined. Preferably the first stages (a) in B-1 and B-2 comprise approximately 30 to 90 weight percent of the total weight of each graft polymer composition. In modifier B-1 it is preferred that the first stage substrate (a)(ii) is comprised of approximately 5 to 45 weight percent vinyl-based polymer.

Preferred organosiloxane polymers are comprised primarily of units of the formula $R_nSiO_{(4-n)/2}$ wherein R is hydrogen or a monovalent hydrocarbon radical of about 1 to 16 carbon atoms and n is 0, 1 or 2. Preferred vinyl-based polymer components of the first stage substrate B-1 (a)(ii) comprise primarily alkenyl aromatic units, (meth)acrylate units or mixtures thereof. Especially preferred is polystyrene. Preferred vinyl-based polymers of subsequent stages B-1(b) and B-2(b) comprise at least one selected from the group consisting of alkenyl aromatic compounds, (meth)acrylate compounds, vinyl cyanide compounds, maleimide compounds and acrylamide compounds. Especially preferred are polystyrene, styrene/acrylonitrile copolymer and styrene/methyl methacrylate copolymer.

Preferred embodiments of the diene rubber-based graft polymer are a first stage (B-2)(a) comprising units of a polybutadiene rubber and a subsequent stage or stages comprising poly(methyl methacrylate) or methyl methacrylate/styrene copolymer.

Among the preferred features of the present invention are subsequent stages in components B-1 and B-2 comprising
  (b)(i) a second stage comprising at least one vinyl polymer and optionally units derived from a cross-linking agent or agents, or and units which serve as a graft-linking agent or agents, units derived from a cross-linking agent or agents and units from the same agent or agents which serve as a graft-linking agent or agents, or a mixture of any of the foregoing; and
  (b)(ii) a third stage comprising at least one vinyl-based polymer or a cross-linked vinyl-based polymer which is the same different than (b)(i).

Preferably the ratio of first stage substrate B-1(a) and B-2(a) to second stage polymer (b)(i) is 10:90 to 90:10 and the amount of third stage polymer (b)(ii) comprises from about 10 to about 90 parts by weight per 100 parts by weight of (a), (b)(i) and (b)(ii) combined. Especially preferred in (B-1) subsequent stage (b)(i) is a composition which comprises a cross-linked butyl acrylate polymer and a subsequent stage (b)(ii) which comprises a styrene/acrylonitrile copolymer.

Preferred saturated polyester resins comprise the reaction product of a dicarboxylic acid or a chemical equivalent thereof and a diol. Especially preferred is poly(1,4-butylene terephthalate). Polyester elastomers preferably comprise a block copolymer consisting of (1) polyester segments and (2) polyether or poly(etherimide) segments. Preferred are polyester segments comprising poly(1,4-butylene terephthalate) and polyether or poly(etherimide) segments comprising a polyalkylene ether glycol, or an imide acid capped polyalkylene ether diamine, or a mixture of such segments.

Also contemplated are compositions including an effective amount of flame retardant agents and reinforcing fillers or a combination thereof; and molded, extruded or thermoformed articles made from the above-defined compositions.

DETAILED DESCRIPTION OF THE INVENTION

Polycarbonate resins, suitable for use in this invention, can comprise non-aromatic as well as aromatic forms. With respect to aromatic polycarbonate resins, these can be made by those skilled in this art or can be obtained from a variety of commercial sources. They may be prepared by reacting a dihydric phenol with a carbonate precursor, such as phosgene, a haloformate or a carbonate ester. Typically, they will have recurring structural units of the formula:

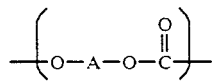

wherein A is a divalent aromatic radical of the dihydric phenol employed in the polymer producing reaction. Preferably, the aromatic carbonate polymers have an intrinsic viscosity ranging from 0.30 to 1.0 dl/g (measured in methylene chloride at 25° C.). By dihydric phenols is meant mononuclear or polynuclear aromatic compounds containing two hydroxy radicals, each of which is attached to a carbon atom of a aromatic nucleus. Typically, dihydric phenols include 2,2-bis-(4-hydroxyphenyl)propane; 2,2-bis-(3,5-dimethyl-4-hydroxyphenyl) propane; 4,4'-di-hydroxydiphenyl ether; bis(2-hydroxyphenyl)methane, mixtures thereof and the like. The preferred aromatic carbonate polymer for component (A) is a homopolymer derived from 2,2-bis(4-hydroxyphenyl) propane(bisphenol-A).

Poly(ester carbonates) for use in the invention are known and can be obtained commercially. Generally, they are copolyesters comprising recurring carbonate groups:

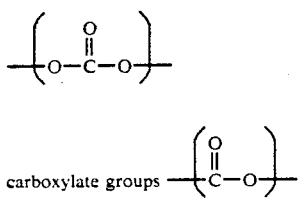

carboxylate groups and aromatic carbocyclic groups in the linear polymer chain, in which at least some of the carboxylate groups and at least some of the carbonate groups are bonded directly to ring carbon atoms of the aromatic carbocyclic groups. These poly(ester carbonates) in general, are prepared by reacting a difunctional carboxylic acid, such as phthalic acid, isophthalic acid, terephthalic acid, homophthalic acid, o-, m-, and p-phenylenediacetic acid, the polynuclear aromatic acids, such as diphenic acid, 1,4-naphthalic acid, mixtures of any of the foregoing, and the like, with a dihydric phenol and a carbonate presursor, of the types described above. A particularly useful poly(ester carbonate) is derived from bisphenol-A, isophthalic acid, terephthalic acid, or a mixture of isophthalic acid and terephthalic acid, or the reactive derivatives of these acids such as terephthaloyl dichloride, or a mixture thereof, and phosgene. The molar proportions of dihydroxy diaryl units to benzenedicarboxylate units to carbonate units can range from 1:0.30–0.80:0.70–0.20 and the molar range of terephthalate units to isophthalate units can range from 9:1 to 2:8 in this preferred family of resins.

The aromatic dihydric phenol sulfone polymer resins useful in component (A) are a family of resins which can be made by those skilled in this art. For example homopolymers of dihydric phenol, and a dihydroxydiphenyl sulfone and a carbonate precursor can be prepared as well as copolymers of a dihydric phenol and a carbonate precursor can be made according to the description in Schnell, et al., U.S. Pat. No. 3,271,367. A preferred material is made by polymerizing bis-(3,5dimethyl-4-hydroxyphenyl)sulfone, alone, or especially in combination with bisphenol-A with phosgene or a phosgene precursor, in accordance with the description in Fox, U.S. Pat. No. 3,737,409. Especially preferred is a copolymer made by reacting 40 to 99 weight percent of the sulfone, 1 to 60 weight percent of the bisphenol with phosgene.

Polyesters suitable for use herein may be saturated or unsaturated or polyester elastomers and are generally derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid have repeated units of the following general formula:

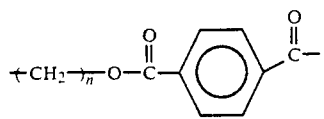

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis-or trans-isomer (or mixtures thereof) of, for example, 1,4-cyclohexanedimethanol with an aromatic dicarboxylic acid as to produce a polyester having recurring units of the following formula:

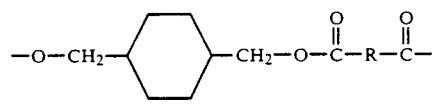

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl) ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic, acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

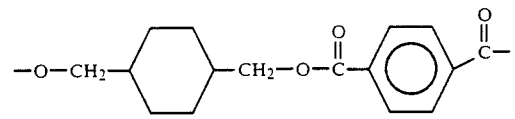

Still another preferred polyester is a copolyester derived from a cyclohexanedimethanol, an alkylene glycol and an aromatic dicarboxylic acid. These copolyesters are prepared by condensing either the cis-or trans-isomer (or mixtures thereof) of, for example, 1,4-cyclohexanedimethanol and an alkylene glycol with an aromatic dicarboxylic acid so as to produce a copolyester having units of the following formula:

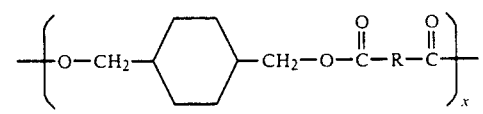

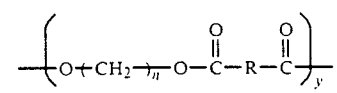

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

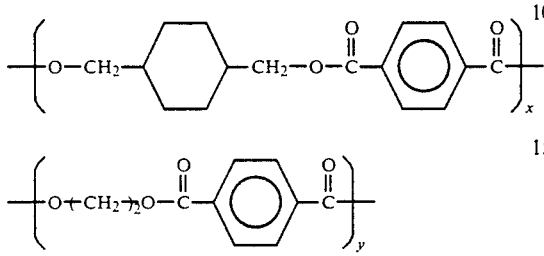

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture or similar solvent at 23°–30° C.

The poly(etherimide ester) elastomers (ii) used herein may be prepared from one or more diols, one or more dicarboxylic acids and one or more high molecular weight polyoxyalkylene diimide diacids. Preparation of such materials is described in detail in U.S. Pat. No. 4,556,705 of R. J. McCready, issued Dec. 3, 1985 and hereby incorporated by reference.

The poly(etherimide ester) elastomers used herein may be prepared by conventional processes, such as esterification and condensation reactions for the production of polyesters, to provide random or block copolymers. Thus, poly(etherimide esters) may be generally characterized as the reaction product of the aforementioned diols and acids.

The amounts of components (A) and (B) can vary broadly, but will usually be in the range of from about 1 to about 99 parts by weight of (A) to from about 99 to about 1 part by weight of (B), per 100 parts by weight of (A) and (B) together. Preferably (A) comprises from about 99 to about 30 parts by weight and (B) comprises from about 1 to about 70 parts by weight.

The multi-stage polyorganosiloxane-based graft polymers may be prepared with or without the incorporation of a vinyl-based polymer. Where incorporation of the vinyl-based polymer is desired, the process is generally described hereinbelow by a co-homopolymerization process.

Co-homopolymerization refers to a polymerization step where two distinct polymerization mechanisms are effected concurrently, including simultaneously. In particular, the first stage co-homopolymerization may encompass a siloxane polymerization (e.g., ring opening and condensation mechanism) in conjunction with a concurrent vinyl polymerization. The discrete mechanisms are not seen as competing with each other, but rather, two homopolymers are concurrently produced each retaining its own structure.

This is evidenced by the two distinct glass transition temperatures which can be detected by differential scanning calorimetry. Preferably, the product of the co-homopolymerization process is rubbery instead of a resin-like powder.

Subsequent to the co-homopolymerization of the siloxanes and vinyl-based monomers of the first step, at least one additional graft polymerization process is utilized to achieve the multi-stage polyorganosiloxane/polyvinyl-based graft polymers of the present invention.

The subsequent graft polymerization is preferably of at least one vinyl-based type monomer. It has been found that a styrene/acrylonitrile copolymer or an alkyl(meth)acrylate polymer is particularly effective as the second stage graft polymer or copolymer, or as the outermost stage when intermediary stages are optionally utilized.

The foregoing polyorganosiloxane/polyvinyl-based graft polymer can be isolated and utilized, for example, as an impact improving agent for thermoplastic resins as will be discussed in detail below.

Additional cross-linking and/or graft-linking agent can be utilized in this initial stage to provide co-homopolymerized networks from both polymeric constituents which provide greater rubber integrity.

The first stage rubbery substrate is provided by a series of sequential processing steps. In a premixing step the ingredients required for the reaction of the organosiloxane(s) and optional vinyl-based monomer(s) are premixed with water and suitable cross-linker(s), graft-linker(s), initiator(s) and surfactant(s). The premixed ingredients are homogenized by conventional means. The reactions may begin at this early stage of the process but these reactions are generally slow at room temperature. The homogenized reactants may be directed to a reactor vessel, typically stainless steel or glass flasks, under a nitrogen blanket. Heat is applied to facilitate the reaction. For typical 5 to 50 gallon stainless steel reactors, a 3 to 6 hour residence time at 75 to 90 degrees centigrade is adequate to complete the co-homopolymerization. Cooling for 2 to 6 hours will typically reduce the temperature to at least room temperature where the reaction mass can be held for 3 to 72 hours. Cooling to lower temperatures (e.g. 5 degrees centigrade) may sometimes be preferred since this may enhance the properties of the newly formed polyorganosiloxane/polyvinyl-based substrate.

Cooling to room temperature or lower allows the polyorganosiloxane portion to build molecular weight, thereby minimizing the extractable silicone rubber fragments and optimizing physical properties of the product for certain applications. Generally, lower temperatures are preferred when it is desired to optimize the elasticity of the formed polyorganosiloxane/polyvinyl-based substrate.

The initiator for the siloxane component can be any ionic ring opening type initiator when cyclic siloxanes are utilized, such as alkylarylsulfonic acids, alkyldiaryldisulfonic acids, alkylsulfonic acids, and the like. The best suited example is dodecylbenzenesulfonic acid which can act as an initiator and at the same time as an emulsifier. In some cases, the joint use of a metal salt of an aforementioned sulfonic acid is also preferred.

The initiator for the optional styrenic or other vinyl-based monomers in the co-homopolymerization process can be any organic soluble radical initiator, such as azobisisobutyronitrile (AIBN) and the organic peroxides, e.g. benzoyl peroxide, dichlorobenzoyl peroxide, and tert-butyl perbenzoate. Also suitable are water-soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH and total solids measurements can be readily monitored at this stage of the process. A latex rubber emulsion prepared as described above will generally contain particles having an average diameter of 100 to 800 nanometers and preferably 150 to 400 nanometers. The particle size is particularly influenced by the homogenization pressure (and the number of passes through the homogenizer) and the composition of the reaction ingredients. A pressure range of 2000 to 12000 psi is typical and 3000 to 9000 psi is preferred. Multiple passes through the homogenizer may be preferred but on a large scale a single pass may be most practical.

The foregoing reaction steps must be followed by a suitable neutralization process to provide the products of the invention. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a pH of at least 6.5, and preferably 7 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery network composed of a polyorganosiloxane/polyvinyl-based substrate. This substrate is the first stage of the graft polymer of the present invention. Optionally, a first stage comprising an organosiloxane polymer with units derived from a cross-linking agent or agents and optionally units which serve as a graftlinking agent or agents may be employed. The organosiloxane polymer can be prepared in a manner according to the prior art, e.g. EPO 0,166,900. Also contemplated are mixtures of the co-homopolymerized substrate with silicone substrates.

In general, the first stage comprising the co-homopolymerized polyorganosiloxane/polyvinyl-based substrate will comprise approximately 5 to 95 weight percent of the total graft polymer based upon the weight of the first stage and the subsequent stage or stages taken together. Preferably the first stage will comprise approximately 30 to 90 weight percent on the same basis. Correspondingly, the subsesquent stages, comprising the additional grafted vinyl polymers, will comprise approximately 95 to 5 weight percent and preferably approximately 70 to 10 weight percent on the same basis. In the multi-stage systems, preferably, the ratio of first stage substrate (B-1)(a) and (B-2)(a) to second stage polymer (b)(i) is 10:90 to 90:10 and the amount of third stage polymer (b)(ii) comprises from about 10 to about 90 parts by weight of (B-1)(a), (B-2)(a), (b)(i) and (b)(ii) combined.

The organosiloxanes useful in the first stage of the composition are any of those known to produce silicone elastomers and may include those which are hydroxy-, vinyl-, hydride- or mercapto- end capped linear organosiloxane oligomers.

The polyorganosiloxanes will be comprised primarily of units of the formula $$R_n SiO_{(4-n)/2}$$

wherein R is hydrogen or a monovalent hydrocarbon radical of about 1 to 16 carbon atoms and n is 0, 1 or 2.

Preferred among the organosiloxanes are those in cyclic form having three or more siloxane units and most preferred are those having three to six units. Such organosiloxanes include, without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or similar organosiloxanes may be used alone or in combination.

The vinyl-based monomers useful in conjunction with the co-homopolymerization of organosiloxanes in the first stage are preferred to be alkenyl aromatic compounds such as styrene, divinylbenzene, alpha-methylstyrene, vinyltoluene, vinylnaphthalene, vinylanthracene, and halogenated styrene or its derivatives. Other suitable vinyl-based monomers include acrylic acids and acrylates such as methyl-, ethyl-, alkyl-, or butylacrylate; methacrylates such as methyl methacrylate, or 2-ethylhexyl methacrylate; vinyl cyanides such as acrylonitrile, and methacrylonitrile; olefins such as ethylene, propylene, butadiene, isoprene, and chloroprene; and other vinyl compounds such as vinyl imidazole, 5-vinyl2-norbornene, vinyl pyrilidine, vinyl pyrrolidinone, vinyl acetate, vinyl alkyl ethers, vinyl chloride, vinyl furan, N-vinylcarbazole, allyl (meth)acrylate, triallyl isocyannurate, ethylene di(meth)acrylate, butylene di(meth) acrylate, diallyl maleate, maleic anhydride; maleimide compounds such as maleimide., N-phenyl (or alkyl) maleimides; acrylamides; N-(mono or disubstituted) acrylamides; and mixtures of any of these monomers. In general, any rubbery or glassy vinyl type monomer may be used which can be mixable with the organosiloxane. Typically the vinyl-based component of the first stage co-homopolymer will be present in an amount of approximately 3 to 97 weight percent and correspondingly the organosiloxane component will be present in an amount of approximately 97 to 3 weight percent. Preferably the vinyl-based component will comprise approximately 5 to 45 weight percent of the first stage of the co-homopolymerized substrate.

The cross-linker composition used in conjunction with the organosiloxane component of the present compositions can have the general formula:

$$R^2{}_n - Si(OR^1)_{4-n}$$

wherein n is 0, 1 or 2, preferably 0 or 1, and each $R^1$ independently represents hydrogen or a monovalent hydrocarbon radical selected from among alkyl or aryl radicals having 1 to 16 carbon atoms, preferably methyl, ethyl and phenyl. $R^2$ can be the same as $R^1$ or can be a vinyl, alkenyl, thio, or (meth)acryloxy alkyl functional radical. When $R^2$ is a vinyl, alkenyl, thio or acryloxy alkyl radical and the n is 1 the cross-linker compound can also act as a graft-linker.

A preferred cross-linker compound is tetraethoxysilane. A combination cross-linking and graftlinking compound is vinyltriethoxysilane. Another suitable choice is gamma-methacryloxypropyltrimethoxysilane.

The multi-stage polyorganosiloxane/polyvinylbased graft product of the present invention can be isolated by conventional means such as hot solution coagulation. For example, an electrolytic solution of about 0.5 to 5 percent aluminum sulfate or magnesium sulfate in water can be prepared and heated to about 75° to 95° C. When the latex is added, with agitation, the graft product will precipitate and can be held at an elevated temperature for about 10 minutes whereupon it may be filter washed. Commerical latex isolation techniques such as spray dryers may also be utilized.

The grafted polymers will preferably be the product of a vinyl polymerization process. Suitable vinyl monomers for graft polymerization include, without limitation, alkenyl aromatic compounds such as styrene, divinylbenzene, alpha-methylstyrene, vinyl toluene, halogenated styrene and the like; methacrylates such as methyl methacrylate and 2-ethylhexyl methacrylate; acrylates such as acrylic acid, methyl acrylate, ethyl acrylate and butyl acrylate; vinyl cyanide compounds such as acrylonitrile and methacrylonitrile; olefins such as ethylene, propylene, butadiene, isoprene, and chloroprene; other vinyl compounds such as acrylamides, N-(mono or di-substituted)alkyl acrylamides, vinyl acetate, vinyl chloride, vinyl alkyl ethers, allyl (meth)acrylate, triallyl isocyannurate, ethylene dimethacrylate, diallyl maleate, maleic anhydride; and maleimide compounds such as maleimide, and N-phenyl (or alkyl) maleimide; and mixtures of these monomers.

The vinyl polymerization is accomplished in an emulsion; therefore, water-soluble initiators are suitable, e.g. potassium persulfate, sodium persulfate and ammonium persulfate. It is practical to add the initiator at the beginning of this step, prior to charging the vinyl monomer for the second stage polymerization. Other Redox initiator systems, such as cumene hydroperoxide/ferrous sulfate/glucose/sodium pyrophosphate, can also be utilized at this stage as well as other organic peroxides.

The diene rubber-based graft polymer compositions comprise a first stage substrate of units derived from a diene rubber and optionally units derived from a crosslinking agent or agents. Dienes are generally classified as hydrocarbon-based molecules having at least two conjugated double bonds. Other examples of diene rubbers are styrene/butadiene rubber, acrylonitrile/butadiene, isoprene rubber, chloroprene rubber or 1,3-dimethylbutadiene rubber.

Vinyl-based polymers useful in the subsequent stages are selected from alkenyl aromatic compounds, (meth)acrylate compounds, vinyl cyanide compounds and acrylamide compounds.

Alkenyl aromatic polymer resins useful as component B-1(b) and B-2(b) are in general those having at least 25 percent of their units derived from a monomer having the formula

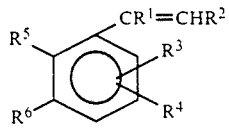

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

Materials that may be copolymerized with the units of the alkenyl aromatic monomer include those having the general formula:

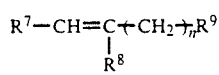

wherein $R^7$ and $R^8$ represent a substituent selected from the group consisting of hydrogen, halogen, an alkyl group of 1-4 carbon atoms, carboalkoxy or $R^7$ and $R^8$ taken together represent an anhydride linkage (—COOOC—) and $R^9$ is hydrogen, vinyl, an alkyl or alkenyl group having 1 to 12 carbon atoms, cycloalkyl, carboalkoxy, alkoxy-alkyl, alkyl carboxyl, ketoxy, halogen, carboxy, cyano or pyridyl and n is 0 or a whole number between 1 and 9.

(Meth)acrylates are generally produced in a two-step process wherein an acetone is reacted with a hydrogen cyanide to form an acetone cyanohydrin which is then heated in the presence of an alcohol to produce the (meth)acrylate. Preferred (meth)acrylates are methyl acrylate, ethyl acrylate, butyl acrylate and methyl methacrylate.

Vinyl cyanides useful in the practice of the present invention are comprised of the following general formula

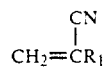

wherein $R_1$ is an alkyl group of from 1 to 6 carbon atoms.

Acrylamides are well known in the art and generally comprise hydrocarbons having a group comprising the following general formula

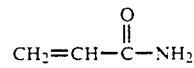

The thermoplastic resin composition may also contain an effective amount of any suitable additives such as addition rubbers, polymers, fillers, pigments, dyes, antioxidants, stabilizers, ultraviolet light absorbers and mold release agents.

The reinforcing filler can be comprised of any organic or inorganic filler including but not limited to glass fiber, carbon fiber, aramid fiber, metallic fiber, asbestos, whisker, glass beads, glass flakes, calcium carbonate, talc, mica, aluminum oxide, magnesium hydroxide, boron extrude, beryllium oxide, calcium silicate, clay or metal powder.

Platinum compounds are often utilized in conjunction with polyorganosiloxane compositions in order to enhance the flame retardance of the latter. Platinum complexes are also used as catalysts in certain hydrosilation processes although such catalysts are not necessary for the practice of the present invention. As flame retarding additives; however, there may be utilized the reaction product of chloroplatinic acid and organosilicon compounds as described in U.S. Pat. No. 3,220,972. Another platinum compound is seen in U.S. Pat. No. 3,775,452 describing platinum-containing polyorganosiloxanes. Other fire retardants are compounds based on elementary red phosphorous compounds, other phosphorous compounds, halogens, antimony oxides, iron oxides, zinc oxides and the like.

DESCRIPTION OF THE PREFERRED EMBODIMENTS

The following examples illustrate the present invention. They are not to be construed to limit the claims in any manner whatsoever.

A single slash is used between momoners of a single stage and a double slash or a hyphen is used as a shorthand method of indicating separation between stages. The first stage to be polymerized is written first before the double slash or hyphen, and subsequent stages are written subsequently.

EXAMPLE 1

General Procedure for Silicone-S/AN Graft Copolymer (GSiM) Synthesis

To deionized water, 400 parts, containing 1.33 parts of dodecylbenzenesulfonic acid dissolved therein is added a mixture comprising 90 parts of octamethylcyclotetrasiloxane, 5 parts of tetravinyltetramethylcyclotetrasiloxane, 5.5 parts of vinyltriethoxysilane, 1.7 parts of tetraethoxysilane, 1.43 parts of gamma-methacryloxypropyltrimethoxysilane, 0.67 parts of divinylbenzene and 0.093 parts of a platinum catalyst (Silicone Product No. 88034). The emulsion is homogenized by passing twice through a homogenizer at a pressure of 7600 to 8600 psi. The emulsion is then stored for 5 hours at 75° C. and cooled for 13 hours overnight. The silicone emulsion is then neutralized to pH 7.5 by adding 5 parts of 15 percent aqueous potassium carbonate solution. The silicone rubber has a yield of about 83.5 percent, gel content of about 71.3 percent and a 14.6 degree of swelling. The sol fraction possesses a Mw/Mn of 48,600/19,700 measured by gel permeation chromatography against polystyrene standards. To the core latex is then graft polymerized at 75/25 mixture of styrene/acrylonitrile for 6 hours at 75° C. which is persulfate initiated. The polymers are then isolated by coagulation and vacuum dried at 65° C. resulting with a silicone-styrene/acrylonitrile weight ratio of 72:28 based on final conversion. The S/AN graft efficiency is 25 percent.

General Procedure for Blend Preparation

A dry blend of polybutylene terephthalate, Lexan ® 141, stabilizers and silicone-S/AN (GSiM) graft polymer are tumble mixed to give a homogeneous powder dispersion within the pellets. The blend is then fed into a Werner Pfleiderer 30 mm twin screw extruder under the following conditions:

| Screw Speed | 200 RPM |
| --- | --- |
| Throughput Rate | 20 lb/hr |
| Zone 1 | 195° C. |
| Zone 2 | 210° C. |
| Zone 3-5, die | 230-250° C. |

The extrudate is pelletized, dried at 140° F. and then injection molded on a 75 ton Newbury molding machine. Tests are according to ASTM methods.

For comparison purposes, test specimens of Lexan ® 141 are formed with polybutylene terephthalate and the silicone-styrene/acrylonitrile (GSiM) respectively. The results and compositional data are set forth in Table 1.

TABLE 1
POLYESTER/POLYCARBONATE GSiM MODIFIER BLENDS

| | Example | | |
| --- | --- | --- | --- |
| | 1A* | 1B* | 1 |
| Composition | | | |
| Valox ® 315, wt % | 39 | 39 | 39 |
| Lexan ® 141, wt % | 45.75 | 45.75 | 45.75 |
| KM653, wt % | 14 | — | 7 |
| GSiM, wt % | — | 14 | 7 |
| Stabilizers, wt % | 1.25 | 1.25 | 1.25 |
| Properties | | | |
| 60° Gloss, % | 96.0 | 68.3 | 62.3 |
| NI, ft-lbs/in | | | |
| ⅛" | 12.1 | 11.4 | 12.6 |
| thermal aging** | 10.8 | 3.0 | 11.0 |
| Retention, % | 89.3 | 26.3 | 87.3 |
| Delta Yellow Index*** | 18.9 | 4.9 | 5.5 |
| Charpy NI, ft-lbs/in | | | |
| R.T. | — | 8.1 | — |
| 10° C. | — | 6.1 | — |
| 0° C. | 8.8 | 2.8 | 8.1 |
| −10° C. | 8.0 | 2.9 | 7.6 |
| −20° C. | 3.1 | — | 5.1 |
| −30° C. | 2.9 | 2.0 | 2.7 |
| Tensile Strength | | | |
| Yield, Kpsi | 8.1 | 6.9 | 6.7 |
| Break | 6.6 | 6.1 | 5.6 |
| Tensile Modulus | | | |
| Kpsi | 15.5 | 14.4 | 14.9 |
| Elongation, % | | | |
| Yield | 8.6 | 7.9 | 7.3 |
| Break | 169 | 29 | 42 |

*Control Sample
Valox ® 315 = a poly(1,4-butylene terephthalate)
Lexan ® 141 = a poly (bisphenol-A carbonate)
KM653 = Rohm & Haas Acryloid ®, butadiene rubber substrate S/MMA outer stage
GSiM = Silicone-styrene/acrylonitrile prepared as described above
NI = Notched impact
**thermal aging at 96 hours at 125° C.
RT = room temperature
***yellowness increase after aging for 96 hours at 125° C.

As is clearly demonstrated from the table above, only the example containing both the diene-based modifier and the GSiM modifier in combination exhibits uniformly good physical properties, possessing good impact resistance, low temperature ductility, tensile strength, desirably low gloss and resistance to yellowing and property loss because of thermal aging. The blend containing only the diene-based modifier while exhibiting good strength related characteristics exhibits poor resistance to yellowing and has a high gloss. The blend containing only the GSiM modifier (1B*) does not exhibit good low temperature ductility in the blends, has poor thermal stability, and is inferior to the blend combination in most other respects as well.

EXAMPLES 2-4

To 400 parts of deionized water containing 1.33 parts of dodecylbenzenesulfonic acid dissolved therein is admixed an organic mixture comprising 90 parts of octamethylcyclotetrasiloxane, 10 parts of tetravinyltetramethylcyclotetrasiloxane, 1.7 parts of tetraethoxysilane, 1.43 parts of gamma-methacryloxypropyltrimethoxysilane, 0.097 parts of a platinum catalyst solution, 33.3 parts of styrene and 0.67 parts of divinylbenzene. The mixture is stirred and the homogenized twice under an impinging pressure of about 8000 psi. The crude emulsion is then polymerized at 75° C for 6 hours followed by overnight cooling down to room temperature. A potassium persulfate solution (0.17 parts in 8.17 parts deionized water) is added over the first four hours at 75° C. as a styrene polymerization initiator. The silicone/-polystyrene substrate emulsion is then quenched by neutralization from pH 1.7 to 8.1 following an optional addition of 0.67 parts of GAFAC RE610 which is pre-dissolved in 6 parts of deionized water. The silicone/polystyrene rubber has a polymerization yield of 87.3 percent, a mean diameter of 230 nm, a gel content of 78 percent and a 13.6 degree of swelling. To the substrate latex is grafted polymerized a 75/25 S/AN mixture for a total of 6 hours at 75° C. using potassium persulfate as the initiator. The substrate to S/AN weight ratio is 70:30 and the second stage graft efficiency is measured at 60 percent using MEX Soxhlet extraction.

Comparison examples are also tested varying the amounts and types of modifiers employed. The results and compositional data are set forth below in Table 2.

TABLE 2
RED PIGMENTED BLENDS

| | Examples | | | | |
|---|---|---|---|---|---|
| | 2A* | 2B* | 2 | 3 | 4 |
| Valox ® 315 (39%), gms | 780 | 780 | 780 | 780 | 780 |
| Lexan ® 141 (44.75%), gms | 895 | 895 | 895 | 895 | 895 |
| Lexan ML4545 (1%), gms | 20 | 20 | 20 | 20 | 20 |
| KM-653 (14%), gms | 280 | — | 70 | 140 | 210 |
| CSiM | — | 280 | 210 | 140 | 70 |
| Red 624 (1%), gms | 20 | 20 | 20 | 20 | 20 |
| Stabilizers, gms | 25 | 25 | 25 | 25 | 25 |
| Properties | | | | | |
| DG, ft-lbs/in | 32.2 | 13.7 | 20.0 | 24.3 | 28.6 |
| N.I., ft-lbs/in | | | | | |
| RT | 14.1 | 12.2 | 13.9 | 13.3 | 14.4 |
| 96 hrs. 125° C. | 12.0 | 2.9 | 9.8 | 11.1 | 12.3 |
| % Retention | 85.1 | 23.8 | 70.5 | 83.5 | 85.4 |
| Color Appearance | Good | Dull | Dull | Good | Good |
| 60° Gloss | 94.2 | 27.2 | 35.3 | 50.7 | 70.7 |

*Control Sample
Valox ® 315 = a poly(1,4-butylene terephthalate)
Lexan ® 141 = a poly(bisphenol-A carbonate)
Lexan ® ML4545 = polycarbonate powder (Lexan ® 141)
KM-653 = Rohm & Haas Acryloid ®, Impact Modifier
CSiM = silicone/polystyrene-based impact modifier prepared as described above (Examples 2-4)
Red 624 = red colorant
DG, 1" = double gate impact strength
N.I. = notched izod
RT = room temperature As can be seen from the above table, the samples containing the combined modifiers exhibit good impact resistance, appearance and low gloss characteristics. Sample 2A* containing no CSiM, while exhibiting good strength characteristics is glossy and thus not useful in desired low gloss applications.

EXAMPLE 5

The procedure of Example 1 is followed, except dry blending is performed with no polyester resin. A composition will be formed in accordance with the appended claims.

EXAMPLE 6

The procedure of Example 2 is followed substituting butyl acrylate for styrene as the vinyl-based polymer component of the substrate latex. A composition will be formed in accordance with the appended claims.

EXAMPLES 7-8

The procedure of Example 2 is followed substituting polystyrene, and poly(methyl methacrylate), for styrene/acrylonitrile copolymer as the graft stage. Compositions will be formed in accordance with the appended claims.

EXAMPLE 9

The procedure of Example 2 is repeated to produce the silicone/polystyrene first stage substrate. However, at the second stage to the silicone/polystyrene latex is added one stream containing butyl acrylate, butylene glycol diacrylate, diallyl maleate, deionized water and sodium dodecylbenzene sulfonate concurrently with another aqueous stream consisting of a water-soluble initiator over a period of 1 to 3 hours at 75° C. The butyl acrylate to the dry silicone/polystyrene substrate weight ratio is aimed at 35:35. The S/AN grafting procedure of Example 2 is then repeated as are the isolation steps. A composition will be formed in accordance with the appended claims.

EXAMPLES 10-12

Example 2 is repeated three times adding respectively an effective amount of red phosphorous flame retardant, an effective amount of glass fiber and an effective amount of both red phosphorous and glass fiber. Compositions will be formed in accordance with the appended claims.

The above-mentioned patents, patent applications and publications are incorporated herein by reference as are the Standard Test Methods.

Many variations of the present invention will suggest themselves to those skilled in the art in light of the above detailed description. For example, the aromatic polycarbonate can be replaced in whole or in part with a polyester carbonate containing units derived from bisphenol-A, phosgene and terephthaloyl chloride and/or isophthaloyl chloride. The aromatic polycarbonate can be replaced in whole or in part by a polycarbonate containing units of bis(3,5-dimethyl-4-hydroxy phenyl)-sulfone, alone, or combined with bisphenol-A. The poly(ethylene terephthalate) can be replaced in whole or in part by poly(1,4-butylene terephthalate) or by a polyester derived from 1,4-cyclohexanedimethanol alone or combined with ethylene glycol and terephthalic acid and/or isophthalic acid. Platinum complexes may be employed as catalysts in the hydrosilation process. All such modifications are within the full intended scope of the appended claims.

We claim:

1. A composition comprising a polycarbonate resin (A); a mixture (A-1) comprising (i) a polycarbonate resin and (ii) a polyester resin; a mixture (A-2) comprising (i) a polycarbonate resin and (iii) a poly(etherester) elastomer, a poly(etherimide ester) elastomer or a mixture thereof; a mixture (A-3) comprising (i) a polycarbonate resin, (ii) a polyester resin and (iii) a poly(etherester) elastomer, a poly(etherimide ester) elastomer or a mixture thereof; or a mixture (A-4) of any of the foregoing; and an effective low temperature ductility, gloss, impact resistance, discoloring, or thermal aging modifying amount of a modifier composition (B) comprising in combination a multi-stage polyorganosiloxane-based graft polymer composition (B-1) comprising (a) as a first stage, a substrate selected from
(i) an organosiloxane polymer, units derived from a cross-linking agent or agents and optionally units which serve as a graft-linking agent or agents;
(ii) a polymeric co-homopolymerized substrate comprised of, in combination, an organosiloxane polymer and at least one vinyl-based polymer;
(iii) a polymeric co-homopolymerized substrate comprised of, in combination, an organosiloxane polymer, at least one vinyl-based polymer, and units which are derived from a cross-linking agent or agents;
(iv) a polymeric co-homopolymerized substrate comprised of, in combination, an organosiloxane polymer, at least one vinyl-based polymer, and units which serve as a graft-linking agent or agents;
(v) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents;
(vi) a polymeric co-homopolymerized substrate comprised of, in combination, an organo-siloxane polymer, at least one vinyl-based polymer, and a mixture of any of units which are derived from a cross-linking agent or agents, units which serve as a graft-linking agent or agents, or units derived from a cross-linking agent or agents and units from the same or different agent or agents which serve as a graft-linking agent or agents; or
(vii) a mixture of (i) and any of (ii), (iii), (iv), (v) or (vi); and
(b) at least one subsequent stage or stages graft polymerized in the presence of any previous stage and which is comprised of a vinyl-based polymer or a cross-linked vinyl-based polymer; and a diene rubber-based graft copolymer composition (B-2) comprising (a) as a first stage a polymeric substrate comprised of units of a diene rubber and optionally units derived from a cross-linking agent or agents; and
(b) at least one subsequent stage graft polymerized in the presence of any previous stages and which is comprised of a vinyl-based polymer or a cross-linked vinyl-based polymer, the weight ratio of B-1 to B-2 being from 1 to 9:9 to 1.

2. A composition as defined in claim 1 comprising a mixture (A-1) comprising (i) a polycarbonate resin and (ii) a saturated polyester resin.

3. A composition as defined in claim 1 wherein component A, A-1, A-2, A-3 or A-4 comprises from 1 to 99 parts by weight and components B-1 and B-2 comprise from 99 to 1 part by weight per 100 parts by weight of A, A-1, A-2, A-3 or A-4 and B-1 and B-2 combined.

4. A composition as defined in claim 1 wherein said first stages (a) in B-1 and B-2 comprise approximately 5 to 95 weight percent of the total graft polymer composition based upon the weight of said first stage and any subsequent graft stages taken together.

5. A composition as defined in claim 4 wherein said first stages (a) comprise approximately 30 to 90 weight percent of the total weight of each graft polymer composition.

6. A composition as defined in claim 1 wherein in said modifier B-1 said first stage substrate (a)(ii) is comprised of approximately 3 to 97 weight percent organosiloxane-based polymer and correspondingly about 97 to 3 weight percent vinyl-based polymer.

7. A composition as defined in claim 6 wherein said first stage substrate (B-1)(a)(ii) is comprised of approximately 5 to 45 weight percent vinylbased polymer.

8. A composition as defined in claim 1 wherein said organosiloxane polymer is comprised primarily of a mixture of units of the formula

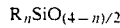

$$R_nSiO_{(4-n)/2}$$

wherein R is hydrogen or a monovalent hydrocarbon radical of about 1 to 16 carbon atoms and n is 0, 1 or 2.

9. A composition as defined in claim 1 wherein in said modifier B-1 the vinyl-based polymer component of said first stage substrate (a)(ii), (iii), (iv), (v) or (vi) is comprised primarily of polymerized alkenyl aromatic units, (meth)acrylate units or a mixture thereof.

10. A composition as defined in claim 9 wherein said vinyl-based polymer component of said first stage substrate (a)(ii), (iii), (iv), (v) or (vi) of said modifier B-1 comprises polystyrene.

11. A composition as defined in claim 1 wherein said vinyl-based polymer in the subsequent stage or stages B-1(b) and B-2(b) include monomers selected from the group consisting of alkenyl aromatic compounds (meth)acrylate compounds, vinyl cyanide compounds, maleimide compounds, acrylamide compounds, or mixtures of any of the foregoing.

12. A composition as defined in claim 11 wherein said vinyl-based polymer is selected from the group consisting of polystyrene, styrene/acrylonitrile copolymer, poly(methyl methacrylate) and styrene/methyl methacrylate copolymer.

13. A composition as defined in claim 1 wherein said first stage substrate (B-2) (a) comprises units of a polybutadiene rubber.

14. A composition as defined in claim 13 wherein said subsequent stage or stages B-2(b) comprise poly(methyl methacrylate), a methyl methacrylate/styrene copolymer or a (styrene/acrylonitrile) copolymer.

15. A composition as defined in claim 1 wherein said subsequent stages in components B-1 and B-2 comprise
    (b)(i) a second stage comprising at least one vinyl polymer and optionally units derived from a cross-linking agent or agents, units which serve as a graftlinking agent or agents, units derived from a cross-linking agent or agents and units from the same agent or agents which serve as a graft-linking agent or agents, or a mixture of any of the foregoing; and
    (b)(ii) a third stage comprising at least one vinyl-based polymer or cross-linked vinyl-based polymer which is the same or different than (b)(i).

16. A composition as defined in claim 15 wherein the ratio of first substrate B-1(a) and B-2(a) to second stage polymer (b)(i) is 10:90 to 90:10 by weight based upon 100 parts by weight of B-1(a) and B-2(a) to (b)(i) combined and the amount of third stage polymer (b)(ii) comprises from about 10 to about 90 parts by weight per 100 parts by weight of B-1(a), B-2(a), (b)(i), and (b)(ii) combined.

17. A composition as defined in claim 15 wherein in B-1 subsequent stage (b)(i) comprises a cross-linked butyl acrylate polymer and subsequent stage (b)(ii) comprises a styrene/acrylonitrile copolymer.

18. A composition as defined in claim 1 wherein said polycarbonate resin (A) comprises poly(bisphenol-A carbonate).

19. A composition as defined in claim 1 wherein said polyester resin (A) (ii) comprises the reaction product of a dicarboxylic acid or derivative thereof and a diol.

20. A composition as defined in claim 19 wherein said polyester resin (A)(ii) comprises poly(1,4-butylene terephthalate).

21. A composition as defined in claim 1 wherein said poly(etherester) elastomer, poly(etherimide ester) elastomer or mixture thereof, (A) (iii), comprises a block copolymer consisting of (1) polyester blocks and (2) polyether or poly(etherimide) blocks.

22. A composition as defined in claim 21 wherein said polyester segments comprise poly(1,4-butylene terephthalate) and said polyether or poly(etherimide) segments comprise a polyalkylene ether glycol or an imide acid capped polyalkylene ether diamine, or a mixture of such segments.

23. A composition as defined in claim 1 which also includes
    (C) an effective amount of a flame retardant agent.

24. A composition as defined in claim 1 which also includes
    (D) an effective amount of a reinforcing filler.

25. A composition as defined in claim 1 which also includes
    (C) an effective amount of flame retardant agent; and
    (D) an effective amount of reinforcing filler.

26. An article molded from a composition as defined in claim 1.

27. An article extruded from a composition as defined in claim 1.

28. An article thermoformed from a composition as defined in claim 1.

29. A composition as defined in claim 15 which also includes
    (C) an effective amount of a flame retardant agent.

30. A composition as defined in claim 15 which also includes
    (D) an effective amount of a reinforcing filler.

31. A composition as defined in claim 15 which also includes
    (C) an effective amount of a flame retardant agent; and
    (D) an effective amount of a reinforcing filler.

32. An article molded from a composition as defined in claim 15.

33. An article extruded from a composition as defined in claim 15.

34. An article thermformed from a composition as defined in claim 15.

* * * * *